(12) United States Patent
Thom

(10) Patent No.: US 7,554,818 B2
(45) Date of Patent: Jun. 30, 2009

(54) TELECOMMUNICATIONS MODULE STORAGE APPARATUS AND METHOD

(75) Inventor: Terry T. Thom, Greenacres, WA (US)

(73) Assignee: Telect Inc., Liberty Lake, WA (US)

( * ) Notice: Subject to any disclaimer, the term of this patent is extended or adjusted under 35 U.S.C. 154(b) by 400 days.

(21) Appl. No.: 11/246,760

(22) Filed: Oct. 7, 2005

(65) Prior Publication Data

US 2006/0274494 A1     Dec. 7, 2006

Related U.S. Application Data

(60) Provisional application No. 60/687,629, filed on Jun. 3, 2005.

(51) Int. Cl.
*H05K 7/14* (2006.01)
(52) U.S. Cl. ............... 361/796; 361/732; 361/737; 361/801; 29/829
(58) Field of Classification Search ............... 361/683, 361/686, 724, 726–729, 732, 740, 752, 759, 361/796, 898, 801, 736, 741, 798, 737; 29/829
See application file for complete search history.

(56) References Cited

U.S. PATENT DOCUMENTS

| | | | |
|---|---|---|---|
| 4,247,882 A * | 1/1981 | Prager et al. ............... 361/686 |
| 4,337,499 A | 6/1982 | Cronin | |
| 5,175,662 A | 12/1992 | DeBalko et al. | |
| 5,233,501 A | 8/1993 | Allen et al. | |
| 5,303,116 A | 4/1994 | Grotz | |
| 5,367,569 A | 11/1994 | Roach et al. | |
| 5,371,648 A | 12/1994 | Bonvallat | |
| 5,436,800 A * | 7/1995 | Maruska et al. ............. 361/752 |
| 5,438,617 A | 8/1995 | Hill et al. | |
| 5,539,801 A | 7/1996 | Herh et al. | |
| 5,546,282 A | 8/1996 | Hill et al. | |
| 5,594,627 A * | 1/1997 | Le ............................ 361/801 |
| 5,596,569 A | 1/1997 | Madonna et al. | |
| 6,034,926 A * | 3/2000 | Dang et al. ............... 369/30.34 |
| 6,215,668 B1 * | 4/2001 | Hass et al. ................... 361/759 |
| 6,283,773 B1 | 9/2001 | Price et al. | |
| 6,707,686 B2 | 3/2004 | Fritz et al. | |
| 6,709,292 B1 | 3/2004 | Barefoot | |
| 6,760,229 B2 * | 7/2004 | Roscoe et al. ................ 361/752 |
| 6,816,388 B2 * | 11/2004 | Junkins et al. .............. 361/801 |
| 6,822,876 B2 | 11/2004 | Goergen | |
| 7,170,753 B2 * | 1/2007 | Campini ...................... 361/737 |
| 7,416,349 B2 * | 8/2008 | Kramer ........................ 385/77 |
| 2001/0011314 A1 | 8/2001 | Gallagher et al. | |
| 2002/0140433 A1 | 10/2002 | Lawson et al. | |
| 2002/0176681 A1 * | 11/2002 | Puetz et al. .................. 385/134 |

(Continued)

OTHER PUBLICATIONS

International Search Report from Application No. PCT/US06/20265, 2 pages, Filed Sep. 12, 2007.

(Continued)

*Primary Examiner*—Dean A. Reichard
*Assistant Examiner*—Xiaoliang Chen
(74) *Attorney, Agent, or Firm*—Lee & Hayes, PLLC

(57) ABSTRACT

A telecommunications system is provided to allow for the securement of a module to a chassis in multiple positions. The multiple positions may include a storage position and/or an engaged position.

16 Claims, 9 Drawing Sheets

U.S. PATENT DOCUMENTS

2003/0012362 A1 1/2003 Khemakhem et al.
2004/0141521 A1 7/2004 George
2005/0050272 A1 3/2005 Behrens et al.
2005/0152106 A1* 7/2005 Coster et al. ................ 361/683

OTHER PUBLICATIONS

PCT Search Report for PCT Application No. PCT/US06/20534, mailed Mar. 11, 2008 (11 pages).

* cited by examiner

TELECOMMUNICATIONS MODULE STORAGE APPARATUS AND METHOD

RELATED APPLICATION(S)

This application claims benefit of and priority to U.S. Provisional Application No. 60/687,629, filed Jun. 3, 2005, the disclosure of which is hereby incorporated by reference in its entirety.

TECHNICAL FIELD

This invention relates to apparatuses and methods for telecommunication networks, and particularly to apparatuses and methods for attaching telecommunications modules and chasses.

BACKGROUND

As opposed to directly hard-wiring telecommunications equipment, digital signal cross-connect ("DSX") allows for connected equipment to terminate at one or more central locations. This allows for easier adding, removing or rearranging of circuit connections among the equipment. Among other benefits, DSX also offers the ability to test, monitor and repair equipment that is terminated at the DSX central location.

A central DSX location typically includes one or more telecommunications racks, which are referred to as bays when loaded with all necessary DSX equipment. Racks are designed to hold one or more chasses, panels, terminal strips, terminal blocks and/or test and maintenance equipment. Chasses may be either modular or non-modular, which depends on whether they are configured to receive individual telecommunications modules (or "modules"). Modules contain ports, which allow for, among other things, the cross-connecting of telecommunications equipment.

A modular chassis offers the benefit of greater customization, as individual modules can be purchased when additional circuits are desired. A non-modular chassis, however, is built and delivered fully loaded with the maximum number of circuits the chassis is designed to seat. Therefore, in a modular chassis a module may be inserted into and removed from a chassis depending on whether a user wishes to fully engage or disengage the module. Traditionally, however, modules are only secured in the chassis when the module is fully engaged. These modules may be secured in the fully engaged position by different techniques, including the use of screws. When a module is not fully engaged, however, the module is often either positioned in the chassis in an unsecured manner, or is taken out of the chassis completely and placed on top of the rack or on a nearby table.

Both of these instances, however, can be problematic. For example, if the module is merely left unsecured in the chassis, the module may slip out of the chassis and fall onto the floor. This may happen if someone walks by and slightly catches the module with his or her clothing. The module may be damaged in the fall or while the module is lying on the floor in a vulnerable position. Similarly, if a module is left sitting out in the open, such as on a table, the module may be damaged or even lost.

Accordingly, there is need for improved techniques to secure a telecommunications module and a chassis when the module is not fully engaged.

SUMMARY

A telecommunications system is provided to allow for the securement of a module to a chassis in multiple positions. The multiple positions may include a storage position and/or an engaged position.

A method is also provided for coupling a module and a chassis in a telecommunications system. A module is stored in a chassis by inserting the module into the chassis and securing the module in an intermediate position. The module is then released from its secured intermediate position before the module is engaged, so as to place the module in an operative position in the chassis.

This disclosure also provides for a telecommunications module configured to couple to a chassis. The module has a printed circuit board (PCB) with electrical components mounted thereon, as well as one or more notches formed in an edge of the PCB to facilitate secure mounting of the module within a chassis in multiple positions.

BRIEF DESCRIPTION OF THE DRAWINGS

The detailed description is described with reference to the accompanying figures. The use of the same reference numbers in different figures indicates similar or identical items.

DETAILED DESCRIPTION

This disclosure is directed to techniques for securing a telecommunications module to a chassis in multiple positions. The techniques are described in the context of a copper-based connectivity telecommunications environment. However, the described techniques can be implemented in a multitude of other contexts, such as a fiber optic connectivity telecommunications environment.

Exemplary Environment

Figure 1:
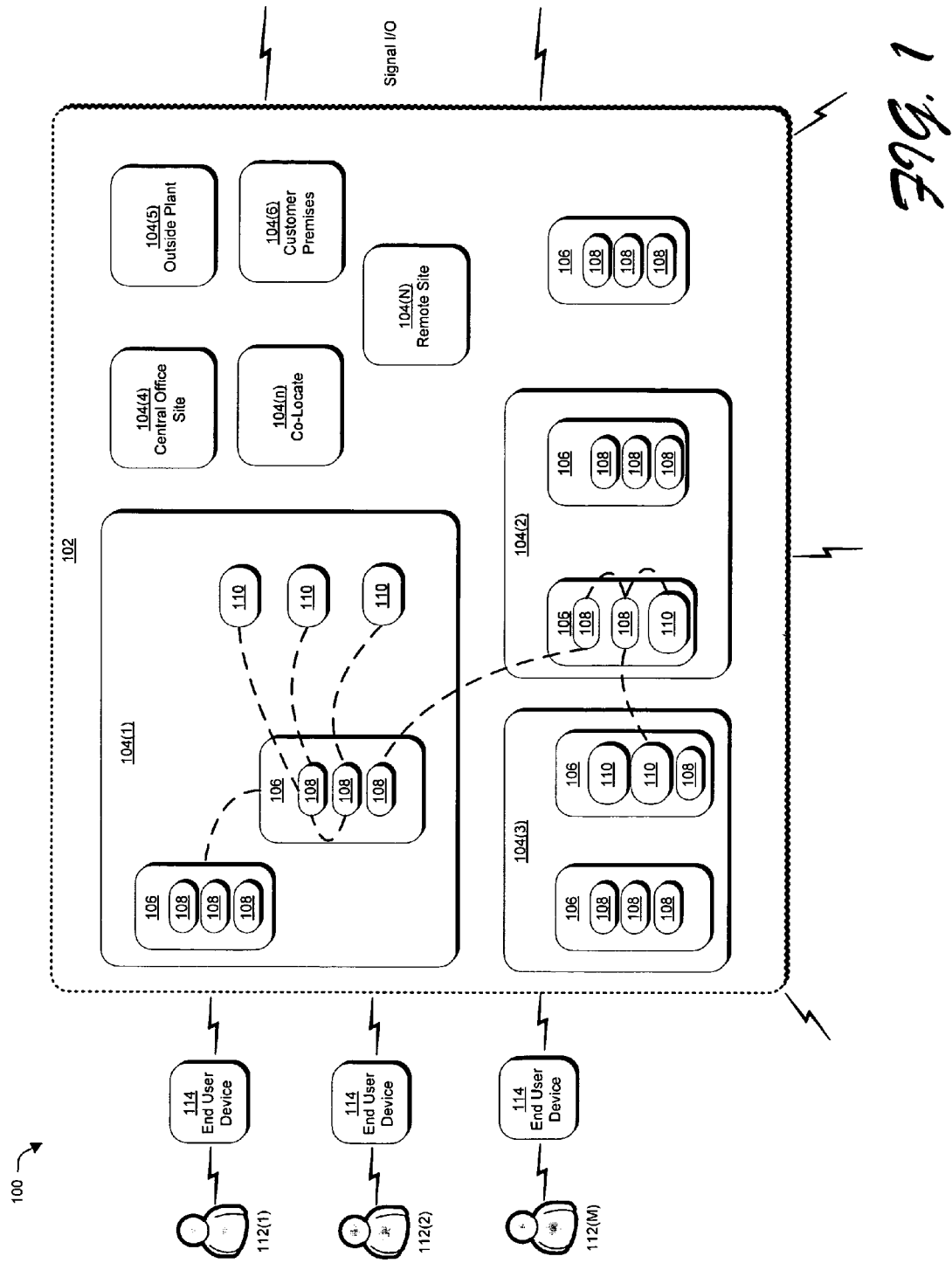
FIG. 1 illustrates an exemplary environment for a telecommunications system.

FIG. 1 illustrates an exemplary implementation of an environment 100 operable to provide a telecommunications network in which the apparatuses and procedures of the present disclosure may be employed. The environment 100 includes at least a portion of a telecommunication network infrastructure 102 (hereinafter "infrastructure"). Infrastructure 102 provides telecommunications processes, structures, equipment and devices between end-user devices such as modems, phones, facsimile devices, and so on used by end-users outside of the infrastructure 102 to communicate via a telecommunications network. Within infrastructure 102 a variety of equipment, apparatus and devices are utilized in routing, processing, and distributing signals. Telecommunications signals and data may be processed, switched, routed, tested, patched, managed, or distributed by various equipment in the infrastructure 102. Infrastructure 102 may include copper, fiber and or other types of communication cabling and transmission media utilized in routing, processing, and distributing telecommunications signals.

A variety of sites 104(1)-104(N) within infrastructure 102 may maintain various equipment used in the infrastructure 102. As depicted in FIG. 1, infrastructure 102 may have numerous sites 104 which may be different physical locations within infrastructure 102 such as a central office, an outside plant site, a co-locate site, a remote site, or customer premises. Sites 104 may be locations within infrastructure 102 which hold a variety of structures and equipment to facilitate processing and distributing of telecommunications signals. The equipment may be centralized in one site (e.g., site 104(1)) or dispersed throughout different sites 104 in infrastructure 102. In other words, interconnections may be made between various sites 104 in infrastructure 102, as shown, for example, by the connection denoted in FIG. 1 by a dashed line between site 104(1) and 104(2). Naturally, numerous interconnections between a plurality of sites 104 may be made.

Each site 104 may have one or more housings 106 having a plurality of components 108. A housing 106 may be configured in a variety of ways to maintain or hold a plurality of components 108 in infrastructure 102. For example, a housing 106 may be configured as a housing for a cabinet, a terminal block, a panel, a chassis, a digital cross-connect, a switch, a hub, a rack, a frame, a bay, a module, an enclosure, an aisle, or other structure for receiving and holding a plurality of components 108. Hereinafter, the terms housing and cabinet will be used for convenience to refer to the variety of structures in infrastructure 102 that may hold components 108.

Housing 106 may be situated in a variety of locations, such as inside a building or placed outside. Housings 106, for example, may be configured to protect components 108 from environmental influences when inside or outside. FIG. 1, for instance, depicts site 104(1) as having two housings (e.g., cabinets) 106, each having a plurality of components 108. Other housings 106 may be included throughout infrastructure 102 at sites 104 as shown, for example, by housings 106 depicted within site 104(2).

Components 108 are pieces of telecommunications equipment in infrastructure 102 that may be kept or maintained in a housing 106 (e.g. cabinet) within the infrastructure 102. Components, for example, may be cross-connect panels, modules, terminal blocks, chassis, backplanes, switches, digital radios, repeaters and so forth. Generally, components 108 may be those devices utilized for processing and distributing signals in infrastructure 102 and which may be maintained in a housing 104. Components 108 may terminate, interconnect or cross-connect a plurality of network elements 110 within infrastructure 102. For example, components 108 may be utilized to distribute telecommunications signals sent to and from infrastructure 102 by one or more end-users 112 using an end-user device 114. The interconnections between telecommunications equipment (e.g. cabinets 106, components 108 and network elements 110) provide signal pathways for telecommunications signals. Interconnection may be via one or more components 108, such as by connectors on a module, or may be internal to the components 108, such as via a printed circuit board within a component 108. Representative interconnections are shown by dashed lines in FIG. 1 and numerous interconnections within and between telecommunication equipment are typical.

Network elements 110 may be implemented in a variety of ways. For example, network elements 110 may be configured as switches, digital cross connect systems (DCS), telecommunication panels, terminal blocks, digital radios, fiber optic equipment, network office terminating equipment, and any other telecommunication equipment or devices employed in a telecommunications infrastructure 102. It is noted that one or more of the components 108 within a cabinet 106 may also be a network element 110. In other words, network elements 110 may be found within a cabinet 106 as a component 108 of the cabinet. Thus, in a particular cabinet 106 interconnections may be between network elements 110 externally (e.g., not in the same cabinet) or internally (e.g., within the same cabinet). Naturally, internal and external interconnections may be mixed, such that a single cabinet 106 will have both internal and external interconnections. Further, such connections for a particular cabinet 106 might be made wholly within a particular site 104. Interconnections may also be made between a plurality of sites 104.

The environment 100 depicts a plurality of end users 112(1)-112(M) which may be communicatively coupled, one to another, via a telecommunication network including infrastructure 102. End users 112 may refer to a variety of users, such as consumers, business users, internal users in a private network, and other types of users that use telecommunications signals or transmit and receive telecommunications signals. Additionally, for purposes of the following discussion clients 112(1)-112(M) may also refer to client devices and software which are operable to transmit and receive telecommunications signals. Thus, clients 112(1)-112(M) may be implemented as users, software and devices.

The interconnection of pieces of equipment (e.g. cabinets 106, components 108 and network elements 110, and so forth) provides signal pathways between equipment for signals input to and output from infrastructure 102. For example, end-users 112(1)-112(M) may send signals into the infrastructure 102 and receive signals output from the infrastructure using a variety of end user devices 114. End user 112(2), for instance, may communicate with end user 112(M) via end-user device 114 (e.g., a telephone). Thus, signals sent to and from infrastructure by end-users 112 via an end user device 114 may be routed directed, processed, and distributed in a variety of ways via the equipment and interconnections within infrastructure 102.

Telecommunications Bay

Figure 2:
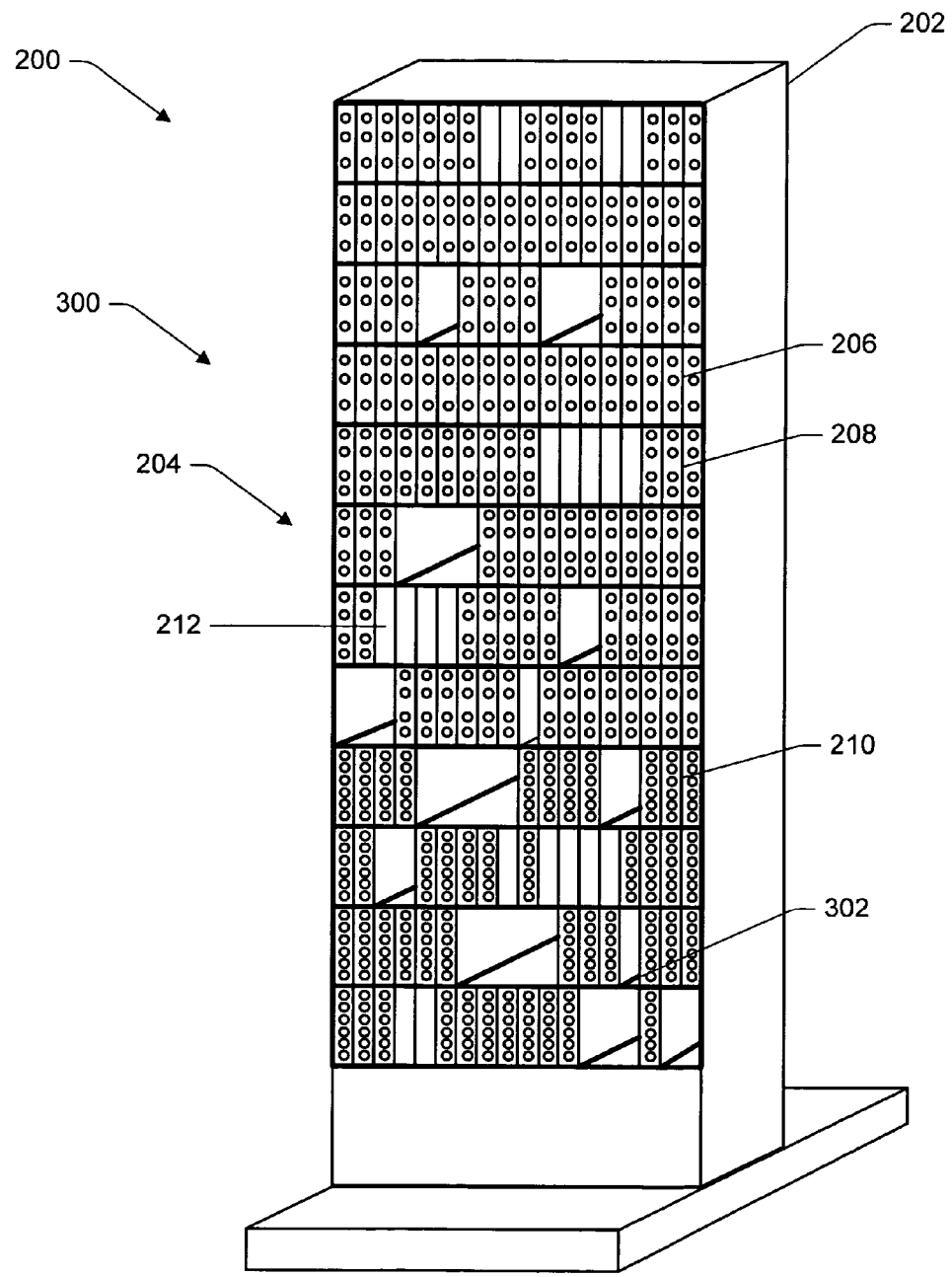
FIG. 2 shows an exemplary telecommunications rack loaded with multiple chasses, which in turn are loaded with a range of modules.

FIG. 2 shows one exemplary implementation of a telecommunications bay 200 currently used in telecommunications systems. Bay 200 typically serves as a central DSX location for connecting multiple telecommunication equipment. Bay 200 is shown loaded with multiple conventional modular chasses 300, which are coupled to a telecommunications rack 202. Chasses 300 are in turn loaded with conventional modules 204, the modules being located within chassis slots 306

Figure 3:
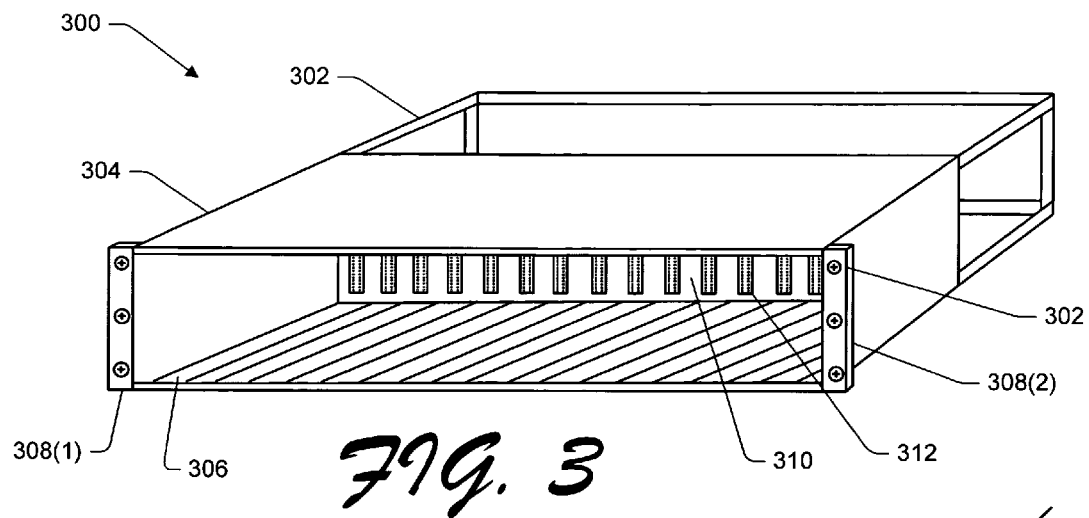
FIG. 3 shows an exemplary chassis currently used in telecommunications systems.

(shown in FIG. 3). Modules 204 may comprise a variety of different types of modules, including three-port modules 206, four-port modules 208 and six-port modules 210. As modules can be inserted into and removed from chassis slots 306, chasses 300 may at times have one or more empty slots. Furthermore, when a slot is not occupied by a module, the slot may be filled with a blank faceplate 214.

Cables (not shown here) that connect telecommunications equipment run to the bay, and are often coupled to the chasses. Telecommunications bay 200 and its accompanying DSX equipment allow for the installation, testing, repairing and monitoring of the connected telecommunications equipment. Often, multiple bays are located in central telephone offices, local exchange offices, or other sites where telecommunications may be routed to and from as discussed in relation to the previous figure. The cables connecting two pieces of equipment are often coupled to one of chasses 300 so as to allow for one of inserted modules 204 to connect to the equipment in series. When this configuration is in place, the module may appear "transparent" to the telecommunications network that connects the equipment. That is, data sent between the equipment may pass through the module, but the module will not affect the data signal. With the module in place, however, the module may be used to monitor, test, patch or repair the connected telecommunication equipment. Often, data traveling through DSX bay 200 will either be traveling at DS-1, a rate of 1.544 million bytes per second ("Mbps"), or DS-3, a rate of 44.736 Mpbs.

Chassis, Module and Attaching Mechanism

FIG. 3 depicts a modular chassis 300 for use with a telecommunications bay, such as bay 200. Chassis 300 may include a frame 302, to which a housing 304 may mount. The housing defines an area where modules 204 may be placed in the chassis. The chassis also typically includes chassis slots 306, which help to further define the proper placement of modules 204, as well as guide the modules into the chassis when the modules are inserted. Two rack attaching plates 308(1), 308(2) are also typically part of the chassis, and are used for connecting the chassis to a rack, such as rack 202. In the chassis of FIG. 3, the plates utilize bolts for attachment to rack 202, although other connections may also be utilized.

Chassis 300 also includes a backplane 310, which mounts to a rear portion of the chassis frame and/or housing, and is typically a printed circuit board. The backplane has a front side and a rear side, while its outer layer is often conductive in order to provide a ground for any stray signals that may otherwise interfere with the transmission of data. Backplane 310 also includes rear side backplane connectors (not shown here) for wiring telecommunications equipment into and out of the backplane and, hence, to chassis 300 and bay 200. Furthermore, the backplane comprises front side backplane connectors 312, which communicatively couple individual modules 204 to the backplane, and, hence, to the connected telecommunications equipment. Front side backplane connectors 312 typically are female DIN (Deutsches Institut fur Normung) connectors.

When a module is communicatively coupled to backplane 310, the module is said to be fully engaged (which is also commonly referred to as being "engaged"). At this point, the module is connected in series to any telecommunication equipment that is connected to the portion of the backplane corresponding to that particular module. In some implementations of conventional modular chassis 300, modules 204 are securely connected to the backplane and, hence, to the chassis, when the module is fully engaged in the backplane. To do so, modules 204 may have male DIN connectors which connect to front side backplane connectors 312.

Figure 4:
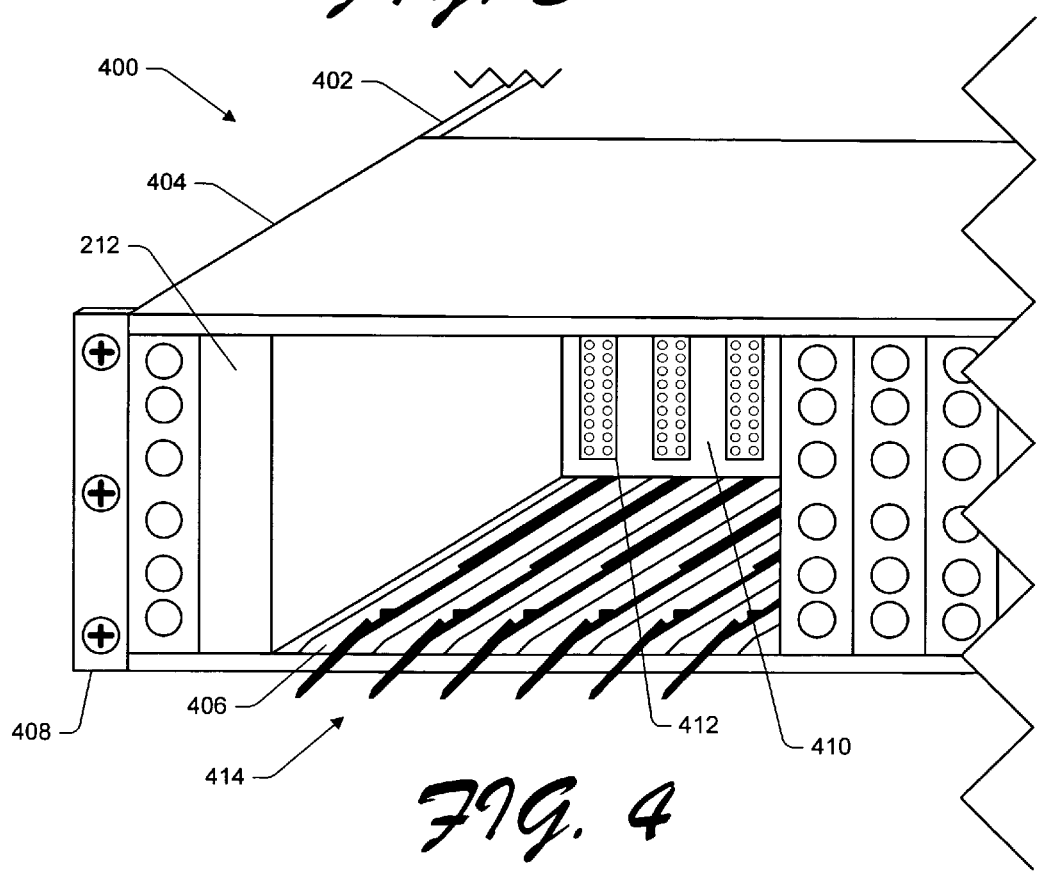
FIG. 4 shows an exemplary implementation of a chassis of the present disclosure, including an exemplary implementation of an attaching mechanism coupled to the chassis.

FIG. 4 depicts another exemplary implementation of a chassis 400. Chassis 400 has many of the features described above in relation to the chassis 300 of FIG. 3, including frame 402, housing 404, chassis slots 406, rack attaching plates 408, backplane 410 and front side backplane connectors 412. Chassis 400 may house a multitude of modules, may be partially or completely empty, or may utilize one or more blank faceplates 212. Chassis 400, however, additionally includes an attaching mechanism 414, which allows a module to couple to a chassis in multiple positions. Attaching mechanism 414 may also be formed, in part or in whole, on the module. One implementation of attaching mechanism 414 will discussed in greater detail with reference to FIG. 7.

Figure 5:
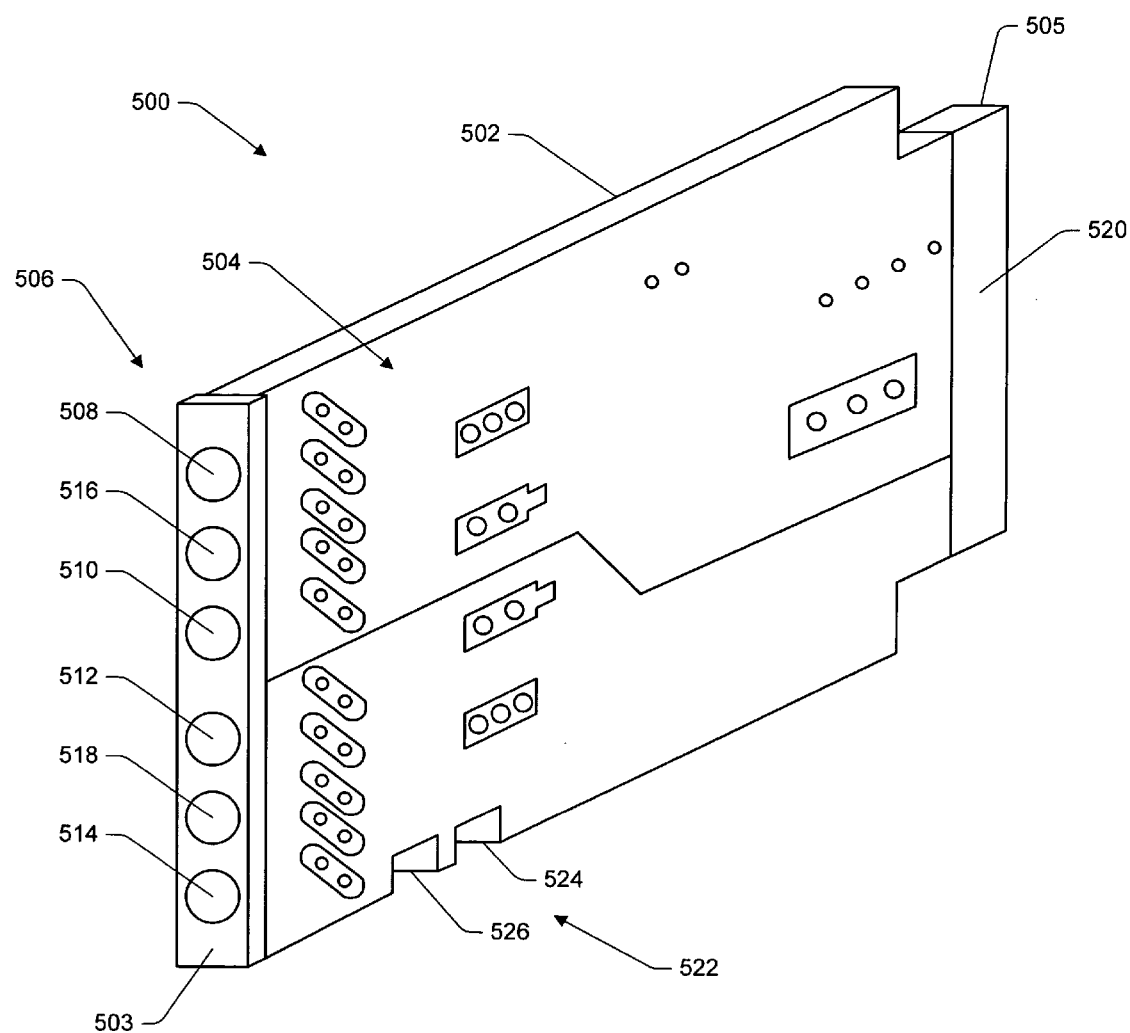
FIG. 5 is a perspective view of an exemplary implementation of a telecommunications module of the present disclosure.
Figure 6:
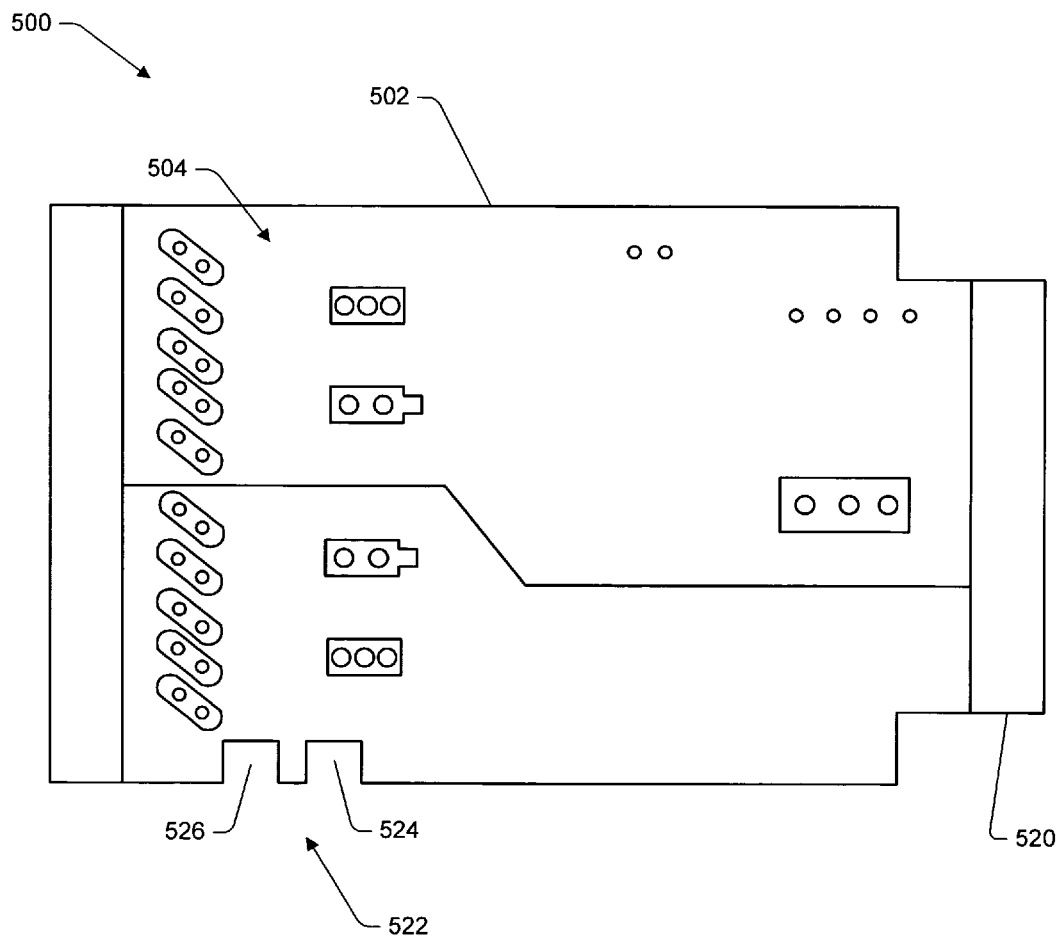
FIG. 6 is a side view of the module of FIG. 5.

FIGS. 5 and 6 depict an exemplary implementation of a module 500. Module 500 includes a printed circuit board ("PCB") 502, which has electrical components 504 mounted thereon, a front panel 503 and a back panel 505. The module 500 also includes one or more ports 506, generally formed vertically as shown in FIG. 5. Ports 506 are used in the cross-connect process, such as for installing, testing, repairing, and monitoring connected telecommunications equipment. Although a module with any number of ports is compatible with the present disclosure, modules with three, four and six ports are most commonly used. Typically, ports 506 will include at least a monitor port 508, an output port 510 and an input port 512. In some implementations, module 500 will have four ports, and will also include a second monitor port 514. In some other implementations, module 500 will have six ports and will further include an output cross-connect port 516 and an input cross-connect port 518. As illustrated, module 500 depicted in FIG. 5 includes all six ports described above.

Module connector 520 is typically also a part of the module, and connects the module to the chassis backplane. In particular, module connector 520 couples the module to the backplane via front side backplane connectors 412. In an implementation, the module connector is a male DIN connector. When the module connector 520 is coupled to the front side backplane connectors 412, which thereby couples the module 500 to the backplane, the module 500 is in the engaged position.

Module 500 may further include one or more notches 522 for facilitating attachment of the module 500 to the chassis in multiple positions. The notches 522 are illustrated as cut-outs in an edge of PCB 502. While any number of notches may be compatible with the present disclosure, module 500 includes two notches. First notch 524 is configured to facilitate the securement of the module to the chassis in a stored or intermediate position. When stored in such a position, the module 500 will typically be disengaged from backplane 410. Second notch 526, meanwhile, is configured to facilitate the securement of the module 500 to the chassis in an engaged position. As such, module connector 520 will typically be coupled to one of front side backplane connectors 412. As illustrated, first notch 524 is located closer to module connector 520 than the second notch 526. Furthermore, the one or more notches may be located anywhere along PCB 502. In some implementations, however, at least one of the one or more notches will be located closer to front panel 503 than to back panel 505. For example, one of the one or more notches may be located at least three times closer to the front panel that to the back panel.

Figure 7:
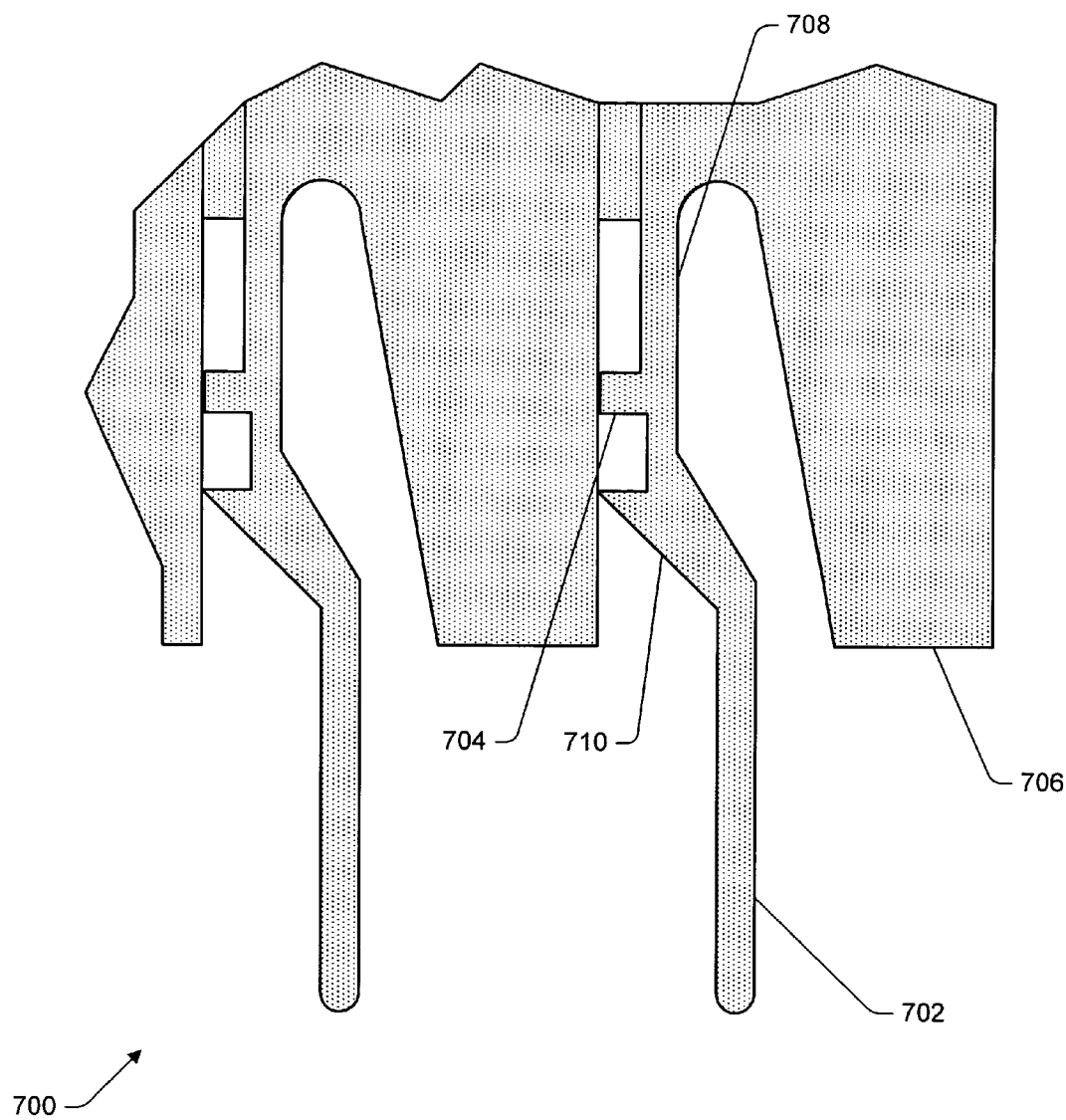
FIG. 7 shows an exemplary implementation of an attaching mechanism of the present disclosure.

FIG. 7 depicts an exemplary implementation of an attaching mechanism 700. Attaching mechanism 700 includes a lever arm 702 and a module stop 704. Module stop 704 is configured to facilitate the securement of module 500 in a desired location, while lever arm 702 enables the module to be released from this secured position. In some implementations, the module stop is a square tab, and may be integral with the lever arm. Attaching mechanism 700 further includes an attaching plate 706, which couples the attaching mechanism to the chassis. The plate may also be integral with the lever arm and/or the module stop in some implementations. Attaching plate 706 may be coupled to the chassis by screws, bolts, glue or by any other coupling means, or the attaching plate may be integral to the chassis itself.

Attaching mechanism 700 further includes a biasing member 708 for positioning the module stop. With the help of the biasing member, module stop 704 has a default position as shown in FIG. 7. In the default position, the module stop is configured to either maintain securement of a module in its present location, if a module is present in the chassis, or stop and secure a module that is entering the chassis. In either instance, once the module is secured it will remain so until the lever arm is activated in opposition to the biasing member, releasing the module. Biasing member 708 may be a spring, or it may simply be integral with the lever arm. In the illustrated implementation, the biasing member is integral with the lever arm and both are made of a plastic. Biasing member, therefore, has a biasing force due to the elasticity of the material. It is noted that the attaching mechanism could be made of any of a multitude of materials.

A module guide 710 for facilitating entry of the module into the chassis may also be utilized by the attaching mechanism. The module guide allows for the module to be properly positioned in the chassis and in a chassis slot. Module guide 710 may be formed at an angle, as illustrated, in order to accomplish this task. As should be apparent from the above description as well as FIGS. 4 and 7, the resulting structure allows a module to be freely inserted into the chassis until the module's progress is halted by the module stop. Therefore, attaching mechanism 700 does not allow the module to be fully inserted into the chassis without first activating lever arm 702. In another implementation, however, such full insertion may be accomplished.

While attaching mechanism 700 represents one way that a module and a chassis may be coupled in multiple positions, multiple other attaching techniques may be utilized. For example, chassis slots 306 could include a discrete bulge. The portion of a module that makes contact with a chassis slot may have a similar size indentation at one or more locations. Therefore, as the module is inserted, the bulge may contact the indentation and secure the module in the module's present location. With further force directed towards engaging the module in the backplane, however, the module could be released and either secured in another position or engaged. While the above examples are illustrative, it should be apparent that a wide variety of examples of attachment mechanism are contemplated to secure the module to a chassis in multiple positions.

Exemplary Module Insertion

Figure 8:
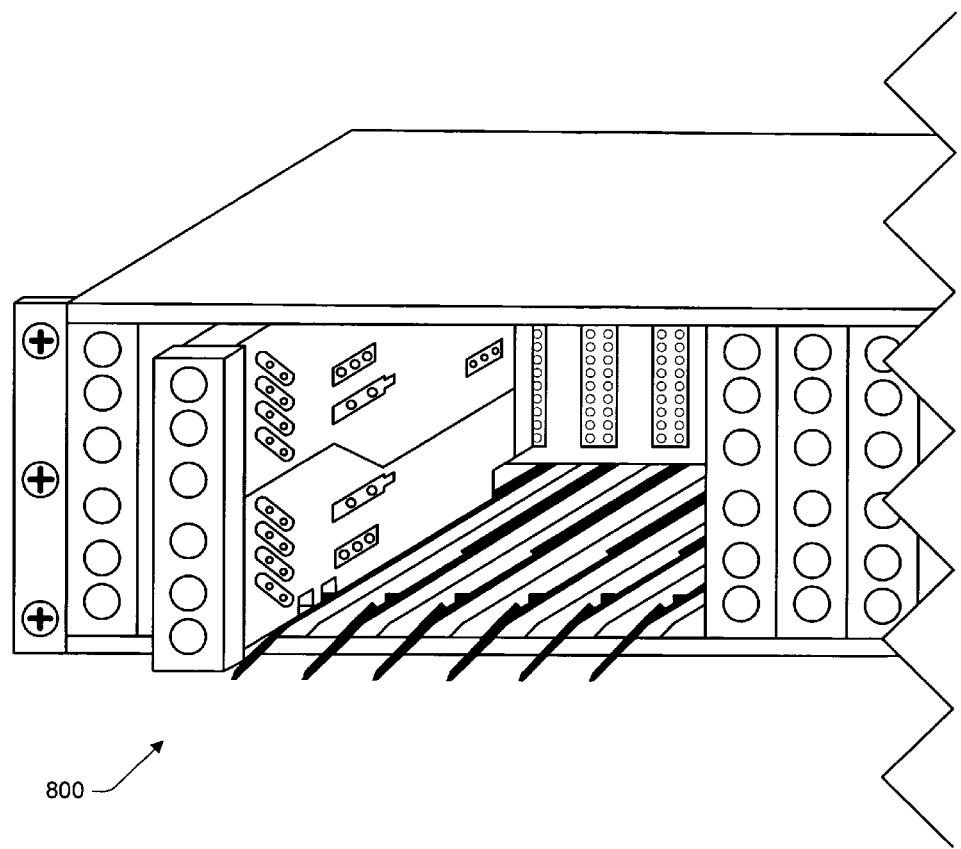
FIG. 8 shows the module of FIG. 5 secured in an intermediate position in the chassis of FIG. 4, which includes the attaching mechanism of FIG. 7.
Figure 9:
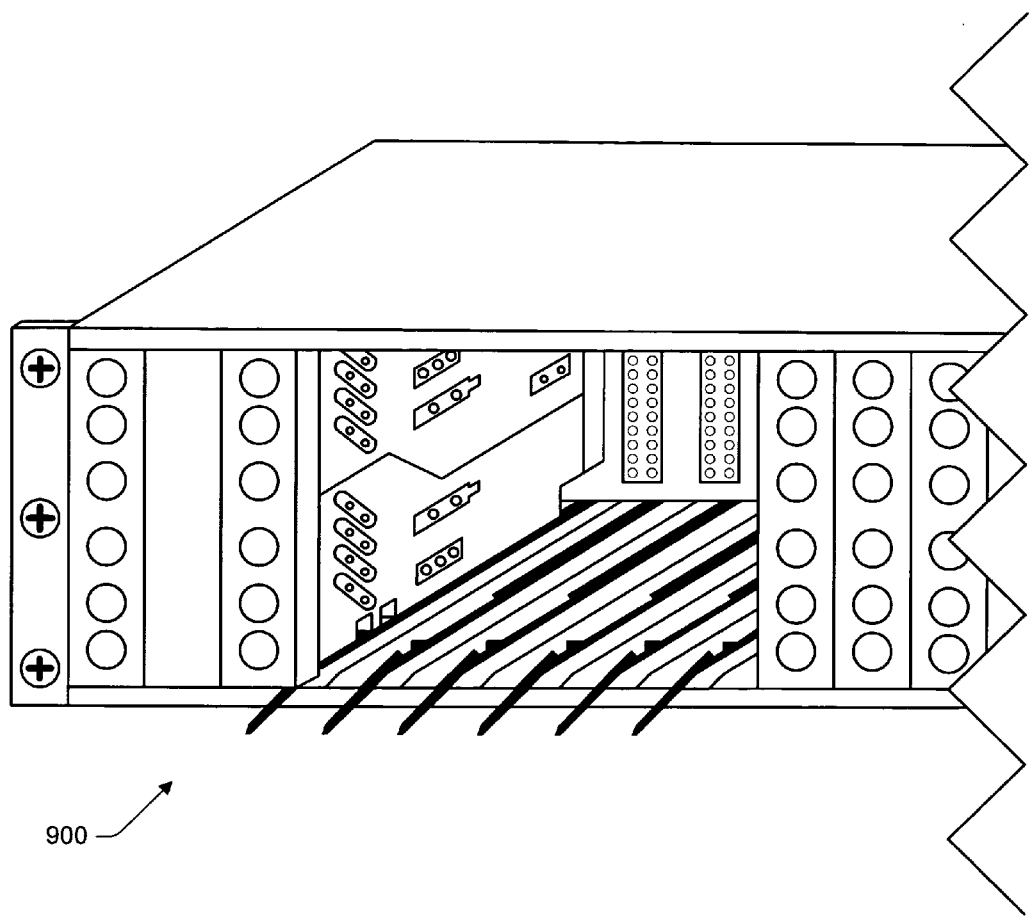
FIG. 9 shows the module of FIG. 5 secured in an engaged position in the chassis of FIG. 4.
Figure 10:
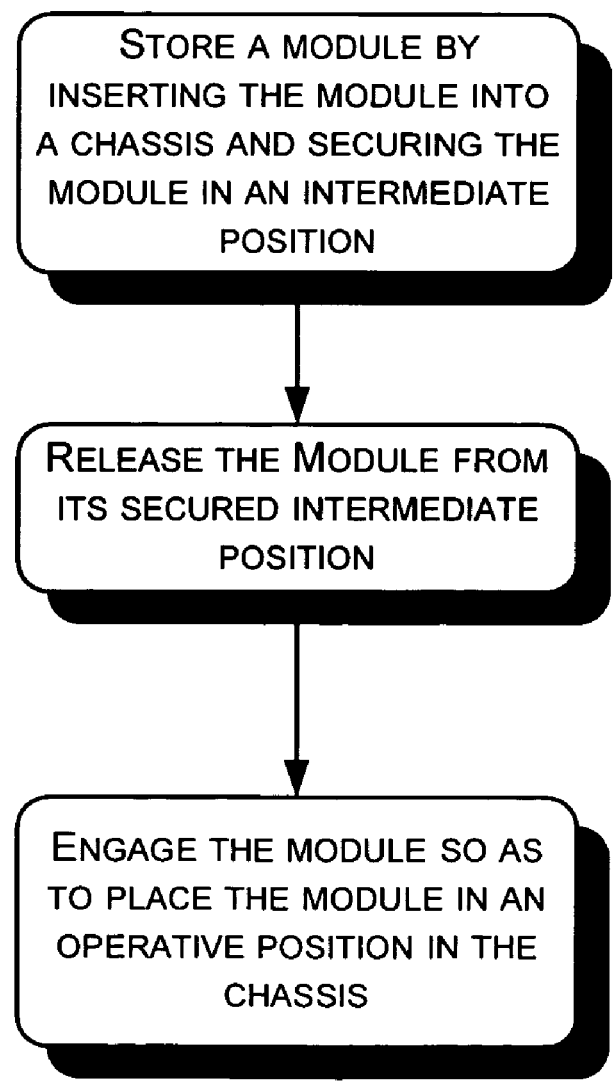
FIG. 10 is a flow diagram that illustrates a process for using a telecommunications system with a module and a chassis, where the module and the chassis are configured to be coupled in multiple positions.

In combination, chassis 400, module 500 and attaching mechanism 700 operate to secure the module to the chassis in multiple positions. FIGS. 8 and 9 show the module in exemplary secured positions in the chassis, while FIG. 10 shows a flowchart of an exemplary method of using the described system. Accordingly, the following discussion will reference each of these figures.

Module 500 may initially be inserted into chassis 400 via chassis slots 406. The module may also be guided into the appropriate location with the help of module guide 710. As the module is inserted into the chassis, the module may push against the module guide in opposition to biasing member 708. This may in turn activate the lever arm and allow the module to freely insert into the chassis and accompanying chassis slots. Module 500 may continue to be freely inserted until first notch 524 contacts module stop 704. Due to the force of the biasing member, the module stop fills the vacancy created by the first notch. Therefore, the insertion of the module halts and the module secures to the chassis in an intermediate position 800, as depicted in FIG. 8. Also as shown in FIG. 8, intermediate position 800 is a position before the module is engaged with the backplane. The intermediate position may function as a storage position when the module is not desired to be in an operative position. Furthermore, because the module may be inserted freely before securing in intermediate position 800, the module cannot be accidentally engaged upon initial insertion.

As FIG. 9 depicts, the module may then be fully inserted and placed in an engaged position 900. When the module is in the engaged position, the module is communicatively coupled with backplane 410. To engage the module however, the module is first released. The module, for instance, may be released by activating lever arm 702, which in turn causes module stop 704 to retreat from the vacancy created by first notch 524. At this point, module 500 may again be freely inserted and the lever arm may be allowed to return to its default position. In some implementations, the module is then engaged and secured to the chassis merely by coupling module connector 520 to one of front side backplane connectors 412. In the illustrated implementation, however, the module may further be secured with the help of second notch 526. Immediately after the module has been fully inserted and engaged, the module stop may fill the vacancy created by the second notch. Again, the biasing member will keep the module stop in this location until the lever arm is activated. Therefore, when the module is in engaged position 900, the module will also be secured by the module stop's insertion in the second notch.

To disengage the module, the lever arm may be activated and the module be pulled out of the chassis slot. Module 500 may then be either re-secured in intermediate position 800 or removed from the chassis entirely.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A telecommunications system comprising:
 a chassis comprising an attaching mechanism, the attaching mechanism comprising:
  a lever arm and a biasing member mounted to the chassis; and
  a module stop member for halting the insertion of a removable module into the chassis and securing the removable module to the chassis until the lever arm and the biasing member attached to the chassis are activated, releasing the removable module;
 wherein the attaching mechanism is configured to allow one or more removable modules to be freely inserted into the chassis before securing to the chassis in multiple positions; and

9 one or more removable modules configured to be securely positioned in the chassis in the multiple positions, wherein each of the one or more removable modules comprises:
a faceplate;
a plurality of ports disposed on the faceplate, the plurality of ports comprising:
a monitor port;
an input port; and
an output port;
a printed circuit board (PCB) with electrical components mounted thereon; and
one or more notches formed in an edge of the PCB to facilitate secure mounting of the removable module within the chassis in the multiple positions, wherein the multiple positions comprise:
a storage position for storage of the removable module; and
an engaged position for engagement of the removable module to a backplane; and
wherein the PCB comprises a front edge and a back edge, and
wherein the one or more notches are located at least two times closer to the front edge than to the back edge to enable storage of each of the one or more removable modules in the storage position.

2. The telecommunications system of claim 1, wherein the one or more modules are communicatively coupled to a telecommunications infrastructure when in the engaged position.

3. The telecommunications system of claim 1, further comprising the backplane, wherein the one or more modules can be communicatively coupled with the backplane when the one or more modules are in the engaged position.

4. The telecommunications system of claim 3, wherein the one or more modules are not communicatively coupled with the backplane when the one or more modules are in the storage position.

5. The telecommunications system of claim 1, further comprising a rack configured to couple with the chassis.

6. A method comprising:
storing a freely-insertable and removable telecommunications module in a chassis by activating a lever arm and a biasing member mounted to the chassis and by inserting the module into the chassis and securing the module in an intermediate position, wherein a module stop member of the chassis halts the insertion of the removable telecommunications module into the chassis and secures the removable telecommunications module in the intermediate position, and wherein the module comprises:
a faceplate;
a plurality of ports disposed on the faceplate, the plurality of ports comprising:
a monitor port;
an input port; and
an output port;
a printed circuit board (PCB) with electrical components mounted thereon; and
one or more notches formed in an edge of the PCB facilitate the securing of the module in the secured intermediate position, and wherein the PCB comprises a front edge and a back edge, and wherein the one or more notches are located at least two times closer to the front edge than to the back edge to enable storage of the module in the secured intermediate position;

10 releasing the module from the secured intermediate position by activating the lever arm and the biasing member mounted to the chassis; and
engaging the module so as to place the module in an operative position in the chassis.

7. The method of claim 6, wherein the engaging of the module comprises placing the module in communication with a backplane.

8. The method of claim 6 further comprising releasing the module from its engaged position and returning the module to the secured intermediate position.

9. A removable telecommunications module comprising:
a faceplate;
a plurality of ports disposed on the faceplate, the plurality of ports comprising:
a monitor port;
an input port; and
an output port;
a printed circuit board (PCB) with electrical components mounted thereon; and
one or more notches formed in an edge of the PCB to facilitate secure mounting of the removable telecommunications module within a chassis in multiple positions, the chassis comprising an attaching mechanism, the attaching mechanism comprising:
a lever arm and a biasing member mounted to the chassis; and
a module stop member for halting the insertion of the removable telecommunications module into the chassis and securing the removable telecommunications module to the chassis until the lever arm and the biasing member attached to the chassis are activated, releasing the removable telecommunications module;
and wherein the attaching mechanism is configured to allow for free insertion of the removable telecommunication module into the chassis before the secure mounting of the removable telecommunication module in the multiple positions, and wherein the multiple positions comprise:
a storage position for storage of the removable telecommunications module; and
an engaged position for engagement of the removable telecommunications module to a backplane; and
wherein the PCB comprises a front edge and a back edge, and wherein the one or more notches are located at least two times closer to the front edge than to the back edge to enable storage of the removable telecommunications module in the storage position.

10. The removable telecommunications module of claim 9, wherein:
at least one of the one or more notches is located at least three times closer to the front edge than to the back edge.

11. The telecommunications module of claim 9, wherein the one or more notches are configured to secure the module in the storage position before the module may be placed in the engaged position.

12. A telecommunications system comprising:
one or more removable modules configured to freely insert and attach to a chassis, each of the one or more removable modules comprising:
a faceplate;
a plurality of ports disposed on the faceplate, the plurality of ports comprising:
a monitor port;
an input port; and
an output port;

a printed circuit board (PCB) with electrical components mounted thereon;

a chassis; and means for attaching the one or more removable modules and the chassis, one to another, in at least two positions, the at least two positions including:

a first position for storing the removable module when the removable module is not in use; and a second position for engaging the removable module with a backplane when the removable module is in use, wherein the attaching means comprises: (i) one or more notches formed in an edge of the PCB of each of the one or more modules to facilitate secure mounting of the respective removable module within the chassis in the at least two positions, (ii) a lever arm and a biasing member mounted to the chassis, and (iii) a module stop member for halting the insertion of a removable module into the chassis and securing the removable module to the chassis until the lever arm and the biasing member attached to the chassis are activated, releasing the removable module; and wherein each of the PCBs comprise a front edge and a back edge, and wherein the one or more notches are located at least two times closer to the front edge than to the back edge to enable storage of the respective removable module in the first position when the respective removable module is not in use.

13. The telecommunications system of claim 12, wherein the attaching means is configured to allow the module to be freely inserted into the chassis until the module reaches the first position.

14. The telecommunications system of claim 13, wherein the attaching means prevents the module from further insertion into the chassis and secures the module in the first position when the module reaches the first position.

15. The telecommunications system of claim 12, further comprising the backplane for communicative coupling with the module, and wherein the first position comprises a position located before the module is communicatively coupled to the backplane.

16. The telecommunication system of claim 12, further comprising the backplane for communicative coupling with the module, and wherein the second position comprises a position where the module is communicatively coupled to the backplane.

* * * * *